United States Patent [19]

Reid et al.

[11] Patent Number: 5,086,841
[45] Date of Patent: Feb. 11, 1992

[54] METHOD OF REDUCING CIRCULATION FLUID LOSS USING WATER ABSORBING POLYMER

[75] Inventors: Ansell L. Reid, Spring; Henry A. Grichuk, Rosenberg, both of Tex.

[73] Assignee: Nalco Chemical Company

[21] Appl. No.: 656,437

[22] Filed: Feb. 19, 1991

Related U.S. Application Data

[62] Division of Ser. No. 367,798, Jun. 16, 1989, Pat. No. 5,034,139.

[51] Int. Cl.$^5$ .............................................. E21B 33/138
[52] U.S. Cl. ................................... 166/295; 166/294; 175/72
[58] Field of Search .................. 166/294, 295; 175/72; 252/8.512, 8.516, 8.551, 315.1

[56] References Cited

U.S. PATENT DOCUMENTS

| | | | |
|---|---|---|---|
| 2,661,334 | 12/1953 | Lummus | 252/8.515 |
| 2,943,051 | 6/1960 | Lummus | 252/8.514 |
| 3,198,252 | 8/1965 | Walker et al. | 166/294 |
| 3,252,903 | 5/1966 | Crittendon | 252/8.551 X |
| 3,711,405 | 1/1973 | Pye et al. | 166/282 X |
| 4,104,173 | 8/1978 | Gay et al. | 166/308 X |
| 4,173,999 | 11/1979 | Messenger | 166/293 |
| 4,445,576 | 5/1984 | Drake et al. | 166/294 X |
| 4,537,700 | 8/1985 | Purinton, Jr. | 166/308 X |
| 4,615,740 | 10/1986 | Pelezo et al. | 252/8.551 X |
| 4,635,726 | 1/1987 | Walker | 166/295 X |

*Primary Examiner*—George A. Suchfield
*Attorney, Agent, or Firm*—Dodge, Bush, Moseley & Riddle

[57] ABSTRACT

Water absorbent polymers provided, in the form of a thixotropic hydrocarbon gel, demonstrate controlled water absorption. This property enables improved usage of such polymers in the reduction of the loss of circulation fluid or as a viscous sweep in the drilling of subterranean wells.

9 Claims, No Drawings

METHOD OF REDUCING CIRCULATION FLUID LOSS USING WATER ABSORBING POLYMER

This application is a divisional application of application Ser. No. 367,798, now U.S. Pat. No. 5,034,139 filed June 16, 1989.

BACKGROUND OF THE INVENTION

This invention relates to certain hydrocarbon gels and to the use thereof in the drilling of subterranean holes. More particularly, the invention relates to hydrocarbon-based gels containing water absorbent polymers and to the use of such gels in reducing the loss of circulation fluid and in other applications during the drilling of subterranean holes and particularly during the drilling of hydrocarbon wells.

Drilling fluids or drilling muds as they are commonly called are essential materials in the drilling of subterranean holes through rock formations, e.g., in the drilling of hydrocarbon or water wells or in obtaining cores in the evaluation of mineral deposits. Such fluids are used to carry cuttings from the drill bit up the annulus to the surface where the cuttings are removed and the mud reused. The muds also serve to seal small pores within the formation being drilled, to reduce the friction of the drilling operation and to clean and cool the drilling bit. Viscous muds are also used during a pause in the drilling operation to "sweep" the space between the bore hole wall and the drill pipe. Such drilling fluids which, with other materials, are circulated between the bore hole wall and the drill pipe are termed circulation fluids, and are often slurries of clay or other inorganic solids in an aqueous- or hydrocarbon-based fluid.

However, for the drilling or circulation fluid to perform these functions it must remain within the bore hole and not be lost into the formation being drilled. In addition, of course, any loss of circulation fluid is of disadvantage economically. Undesirable loss of circulation fluid is commonly encountered and results from passage of the fluid through fractures in the formation caused by excessive mud pressures or pre-existing pores of fissures which are inherent in the nature of the rock formation being drilled.

There are a number of method which have been proposed to help prevent the loss of circulation fluid. Some of these methods can be visualized as the use of fibrous, flaky or granular material designed to "plug" the openings through which circulation fluid is lost by causing the particulate material to settle out of the slurry fluid at the entrances material to settle out of the slurry fluid at the entrances to the openings in the formation after passing down through the well bore. Other methods are proposed to use materials which interact in the fissures of the formation to form a plug of increased strength. U.S. Pat. No. 2,890,169 discloses a method in which a circulation fluid is produced from a slurry of bentonite and cement in oil. This fluid is employed in conjunction with a water-in-oil emulsion designed to break within the formation to provide water to the cement with a resulting increase in strength after placement of the formation to provide water to the cement with a resulting increase in strength after placement of the cement within a formation fissure. U.S. Pat. No. 3,448,800 discloses a similar method of reducing the loss of circulation fluid by consecutively passing into the well dissimilar slurries which mix within the formation to from a cement-like plug.

More recently, methods have been available which utilize the ability of certain organic polymers to absorb large quantities of water relative to the volume or quantity of the polymer. Such water absorbent polymers, themselves water insoluble as well as hydrocarbon insoluble, are injected into the well with the objective of encountering naturally occurring or added water at the entrance to an within an opening in the formation. The resulting swelling of the polymer serves to form a barrier to the continued passage of circulation fluid through that opening into the formation. U.S. Pat. Nos. 3,909,421 and 4,128,528 are illustrative of such use of polymers in the reduction of circulation fluid loss.

It will be apparent that the more effective a water-absorbing polymer is, the more difficult the use of such a polymer becomes. U.S. Pat. Nos. 4,124,748 and 4,320,040 disclose polymers shown to be effective in absorbing relatively large quantities of water and thereby substantially expand in volume. However, the placement of such polymers at specific and desired locations is relatively difficult because premature contact with even small amount of water results in swelling of the polymer at undesirable locations within the bore hole and makes the pumping of the circulation fluid more difficult. Walker, U.S. Pat. No. 4,635,726, describes a method of employing a slug of fluid hydrocarbon having a water absorbent polymer dispersed therein, by injecting the slurry into a borehole and subsequently injecting water. The hydrocarbon slug is forced into a fissure in the formation where it encounters the subsequently added water, provided as such as in the form of an aqueous drilling fluid. The resulting swelling of the polymer serves to plug the fissure and reduce the loss of circulation fluid. In the method of U.S. Pat. No. 4,635,726 the hydrocarbon slug comprises a dispersion of the oleophobic polymer within the hydrocarbon. In using such a slurry, continuous agitation of large amounts of slurry is required to maintain the polymer in suspension and prevent premature settling of the polymer from the hydrocarbon dispersion at undesirable locations. Dymond et al, U.S. Pat. No. 4,670,501 employ polymers which are water-swollen, non-crosslinked polymers to viscosify water-immiscible liquids such as hydrocarbon liquids. The resulting emulsions are said to be useful in drilling operations as lost circulation fluids and fracturing fluids as well as in pipeline pigging operations. It would be of advantage to provide a composition containing hydrocarbon and water absorbing polymer which is more resistant to separation and whose placement and swelling at desired locations during the drilling of a hydrocarbon well is more easily controlled. It would also be of advantage to provide such compositions which, by virtue of controlled swelling upon contact with water, are useful as fluids for viscous sweeps of a subterranean well bore.

SUMMARY OF THE INVENTION

The present invention provides hydrocarbon-based gels comprising hydrocarbon and a water absorbing polymer and to the use of such gels in the drilling of subterranean holes. More particularly the invention relates to compositions comprising major amounts of a hydrocarbon and an organic polymer above to absorb a substantial quantity of water with lesser amounts of certain gelling agents and a surface active agent. Such compositions are resistant to premature interaction with water and are more easily placed at desired locations to permit use as lost circulation fluids as in the closure of formation openings during the drilling of a hydrocarbon or a water well or in obtaining a core sample of a mineral deposit. The compositions are additionally useful as viscous sweeps to clean the annular space between the facing of the bore hole and the drill pipe.

DESCRIPTION OF THE INVENTION

The composition of the present invention comprises a thixotropic hydrocarbon gel of an organic polymer capable of absorbing large quantities of water. The gels are stable, and therefore do not require the continual agitation necessary with the use of a slurry, and yet are pourable and sufficiently mobile to allow easy passage through the borehole. In applications where plugging of a rock formation is desired, the nature of the interaction between the polymer and the hydrocarbon components of the gel is such that swelling due to contact with casually encountered water is minimized, but when placed within a fissure the gel will interact with added water to swell the polymer and plug the fissure. In applications where use of the compositions as a viscous sweep is contemplated, the controlled interaction with casually encountered water permits the composition to be pumped into the drill pipe at low viscosity with maximum viscosity not being reached until the composition to be pumped into the drill pipe at low viscosity with maximum viscosity not being reached until the composition is near the bit, prior to entering the annular space, or even in the lower portion of the annular space.

The hydrocarbon fluids employed as a major component of the gels of the invention are hydrocarbons which are liquid under the conditions of their usage and which are inert towards the polymer and other components of the gel. Suitable hydrocarbon fluids are aromatic, naphthenic or paraffinic or are mixtures thereof, and include diesel oil, kerosene, mineral oils, gasoline or naphtha. Also suitable as the hydrocarbon fluid is crude oil, provided that the brine content of the crude is low. From a practical matter, the availability of hydrocarbon fluid at the drill site would suggest the use of diesel oil or mineral oil or even the use of a crude oil if available. Mineral oil, a light odorless paraffinic solvent, is particularly preferred as the hydrocarbon component of the gels of the invention in part because of the environmental advantages of using a hydrocarbon with little odor and low toxicity.

The water absorbent polymers which are employed in the compositions of the invention are substantially water insoluble and hydrocarbon insoluble and are polymers capable of absorbing large quantities of water or water-based fluids and retaining the fluids under moderate pressures. Such polymers are known, having recognized utility in the production of menstrual articles, disposable diapers and dish clothes where the polymers typically absorb at least 100 times the weight of the polymer in water, but preferably at least 150 times the weight of the polymer or even more. The more efficient of these polymers appear to be the polymers obtained by the polymerization of ethylenically unsaturated acid compounds or salts thereof which have been cross-linked by reaction with a di- or polyfunctional curing agent.

Illustrative of these polymers are the alkali metal polyacrylate polymers marketed by Grain Processing Company as well as the polyacrylamide-polyacrylate salt polymers of the same supplier. A second class of such water absorbing polymers is produced by polymerization of acrylic acid or methacrylic acid in the presence of polyvinyl alcohol, followed by crosslinking, as disclosed by Cramm et al, U.S. Pat. No. 4,698,404. Also suitable as the polymer component of the gels of the invention are saponified copolymers of vinyl esters and ethylenically unsaturated carboxylic acids or derivatives thereof as disclosed by U.S. Pat. No. 4,124,748. These polymers are crosslinked by the use, for example, of diallyl esters of aromatic dicarboxylic acids. Other water absorbing polymers are disclosed by U.S. Pat. Nos. 4,286,082; 4,062,817; 4,340,706; and 4,654,039.

While in general a wide variety of crosslinked polymers containing a major proportion of an ethylenically unsaturated acid and capable of absorbing up to 100 times their weight of water or more are suitable, a particularly useful class of such polymers is produced from polymerizable unsaturated acid compound monomers, particularly ethylenically unsaturated carboxylic acids or anhydrides thereof, ethylenically unsaturated sulfonic acids, or mixtures thereof.

The unsaturated carboxylic acids or anhydrides thereof which are precursors of this preferred class of polymers include acrylic acid, methacrylic acid, ethacrylic acid, alpha-chloroacrylic acid, alpha-cyanoacrylic acid, cinnamic acid, beta-styrylacrylic acid, itaconic acid, citraconic acid, maleic acid, fumaric acid and maleic anhydride. The ethylenically unsaturated sulfonic acids which are suitable precursors of the preferred polymers include vinylsulfonic acid, allylsulfonic acid, vinyltoluenesulfonic acid, sulfoethylacrylic acid, 2-hydroxy-3-acryloxypropanesulfonic acid, 2-hydroxy-3-methacruloxypropane sulfonic acid and 2-acrylamido-2-methylpropanesulfonic acids. The unsaturated acidic monomers particularly useful in the production of the preferred polymers are acrylic acid, methacrylic acid and 2-acrylamido-2-methylpropanesulfonic acid. Of these monomers, the preferred monomer is acrylic acid.

The preferred polymers will contain at least 50% by mole of one or more of at least one of the ethylenically unsaturated acid compounds as above described and preferably contain at least 75% by mole of such acid monomers. The polymer may consist entirely of such unsaturated acid monomers but may have no more than 50% by mole and preferably no more than 25% by mole of other copolymerized monomers free from carboxylic acid or sulfonic acid groups. Such other monomers include unsaturated esters or unsaturated monomers containing hydroxyl or nitrilo groups or quaternary ammonium substituents. The non-acidic monomers are well known and are described in more detail in Masuda et al, U.S. Pat. No. 4,076,633 and Westerman, U.S. Pat. No. 4,062,817, both of which are incorporated herein by reference. Particularly preferred as the polymer component of the gels of the invention are homopolymers of acrylic acid or methacrylic acid, especially acrylic acid, without the presence of non-acidic monomers. Of particular interset are polymers having a molecular weight of from about 10,000 to about 500,000 preferably from about 50,000 to about 500,000 and more preferably from about 75,000 to about 300,000.

The general method of producing such polymers are known as is the crosslinking of the polymers with alkenyl esters of aromtic dicarborylic acids, e.g., diallyl phthalate, or with glycidyl ethers and (poly)glycerine diglycidyl ether. See, for example, U.S. Pat. Nos. 4,340,706; 4,760,501; and 4,698,404, each of which is incorporated by reference.

The gels of the invention contain a minor proportion of a surface active agent. Suitable surface active agents are the anionic and nonionic surface active agents often referred to as soaps or detergents. Illustrative anionic surface active agents include salts of long chain fatty acids known as soaps, metal salts of sulfonic acids such as alkanesulfonic acids, alkylbenzenesulfonic acids and the mixtures known as petroleum sulfonates, salts of sulfated alcohols or sulfated ethoxylated alcohols and salts of partially esterified alloxylated phosphate esters. These anionic agents are typically metal salts wherein the metal is an alkali metal or an alkaline earth metal, particularly sodium. The preferred surface active agents, however, are nonionic surface active agents such ethoxylated alkylphenols or (poly)glycerol esters of alkpahtic carboxylic acids or of ethoxylated aliphatic carboxylic acids. Particularly preferred as the nonionic surface active agents is an ethoxylated alkylphenol, particularly an ethoxylated alkylphenol having at least one alkyl group of from 6 to 12 carbon atoms inclusive and having an average of up to 30 ethoxylate groups per molecule, for example an ethoxylated octyphenol having an average of up to 9 ethoxylate units per molecule.

The precise chemical nature of the surface active material is not critical provided that it is an anionic or non-ionic surface active agent. As stated above, however, nonionic surface active agents are preferred, especially those of up to 35 carbon atoms per molecule, and ethoxylated alkylphenols are a preferred class of nonionic surface active agents. The precise quantity of the surface active agent to be employed in the compositions of the invention is not critical. Amounts of surface active agent from about 3% by volume to about 10% by volume based on total composition are satisfactory with amounts of from about 3% by volume to about 7% by volume on the same basis being preferred.

The hydrocarbon-based composition is gelled by the presence therein of phosphorus-containing hydrocarbon gelling agents. Such agents are conventionally used to gel hydrocarbon mixtures and a variety of phosphorus materials are suitably employed. The preferred gelling agents are crosslinked phosphate esters wherein the ester moieties are alkyl of up to 18 carbon atoms. The phosphate esters employed i the composition of the invention contain a predominant amount, generally more than 40% by mole of a dialkyl phosphate with lesser and approximately equal proportions of monoalkyl ester and trialkyl ester. Within the alkyl phosphate ester moieties, the size and molecular weight of the alkyl groups is of some importance an should average from about 4.5 carbon atoms to about 8 carbon atoms per atom of phosphorus. In one embodiment, such a ester is produced from an alkanol of a single carbon number selected so as to provide an average number of carbon atoms per phosphorus atom within the desired range. In an alternate modification, mixtures of higher and lower alkanols are employed in proportions selected to achieve the desired carbon:phosphorus ratio. The alcohol or mixture of alcohols is reacted with a pentavalent phosphorus compound. Phosphorus pentoxide is often used as the source of the phosphorus, although lower alkyl phosphate esters are also satisfactory, producing the phosphate ester of desired carbon number content by ester exchange.

The phosphate ester is crosslinked to provide a gelling agent by reaction with a basic aluminum compound. In one embodiment, the aluminum compound is a basic solution of aluminum trialkoxide, particularly aluminum triisopropoxide. In another modification, the basic aluminum compound is a basic alkali metal aluminate. Sodium is a preferred alkali metal in such aluminates and a preferred basic aluminum compound is sodium aluminate, calculated as $Na_2Al_2O_4$. Such dissolving a hydrated oxide of alumina in concentrated aqueous sodium hydroxide solution. Sufficient sodium hydroxide is used to provide a sodium aluminate solution with a pH above about 13, often above about 14. These phosphate esters and aluminum compounds are broadly described in Griffin, Jr., U.S. Pat. No. 4,153,649 and references contained therein.

The basic aluminum compound is mixed with the phosphate ester to provide the hydrocarbon gelling agent. Without wishing to be bound by any particular theory, it appears probable that the alkyl phosphate ester is crosslinked by the aluminum compound to form an anionic association polymer which serves as the gelling agent. By whatever mechanism applies, the phosphate ester is mixed with from about 5% by volume to about 30% by volume, based on alkyl phosphate ester, of the basic aluminum compound. Preferably, from about 10% by volume to about 20% by volume, on the same basis, of the basic aluminum compound is employed.

The gelling agent produced from the alkyl phosphate ester and the basic aluminum compound is employed in an amount of from about 1% by volume to about 10% by volume, based on total gel composition but preferably in an amount of from about 3% by volume to about 8% by volume on the same basis.

The hydrocarbon-based gel contains a major amount of the hydrocarbon with a lesser but substantial amount of the water absorbent polymer. The hydrocarbon is present in a quantity of at least 40% by volume based on the total composition and is preferably present in an amount of at least 60% by volume on the same basis. The water absorbent polymer is present in an amount up to about 50% by volume based on total composition but preferably si present in an amount of from about 25% by volume to about 45% by volume on the same basis. The polymer is provided in the physical form of particles of a size sufficiently small to pass through the well piping and enter the small fissures or pores through which circulation fluid is lost. Typical particle sizes are from about 0.1 micron to about 5 millimeters depending upon the particular piping and the characteristics of the formation.

The hydrocarbon-based gel is produced by methods conventional for the formation of hydrocarbon gels including the cooling of heated suspensions of the gel components or by solvent exchange techniques. In a simple but efficient method, the gelling agent is added to the hydrocarbon and the resulting mixture is agitated to produce the gel. Subsequently, the surface active agent and the polymer are added to the gel as by stirring or blending.

The hydrocarbon gels of the invention are utilized in a variety of applications relating to the drilling of subterranean holes. In one such application, the gel compositions are employed in the prevention of loss of circulation fluid by procedures similar to those of earlier techniques relative to which the present invention represents an improvement. In Walker, U.S. Pat. No. 4,635,726, there is disclosed a process whereby a hydrocarbon slug containing a suspended water absorbent polymer is injected into the well bore and subsequently forced into the lost circulation zone. Water or alternatively an aqueous drilling fluid si injected into the well, generally after a hydrocarbon "spacer" slug to insulate the polymer-containing hydrocarbon from the water which follows. The water or aqueous fluid contacts the polymer-containing hydrocarbon and the resulting swelling serves to seal off the zone in which the circulation fluid is being lost. This technique requires the use of the mud pit to produce the suspension, the use of continued agitation to maintain the suspension and suffers from the additional disadvantage that any contact of an efficient water absorbent polymer with casual water may prematurely cause swelling of the polymer before it is in the place where the swelling is desired.

The use of the gels of the invention offers a number of substantial advantages. The gels being stable, they can be stored in small containers, e.g., drums, and do not require agitation or the use of the pit facilities. The gels being thixotropic are easily pumped down the well bore without excessive pressure and into the fracture or opening in the formatoin. However, upon entering the formation the presence of gel in likely reestablished to minimize the loss of polymer. Provision of the polymer as a gel serves to reduce or regulate the rate at which the polymer absorbs water. The reduced rate of interaction with water maintains the pumpability of the composition and enhances the likelihood that the polymer will reach the desired location in the formation before substantial swelling of the polymer takes place. The resulting swelling within the formation results in the formation of a seal which is stronger than when swollen or partially swollen polymer is forced into the openings of the formation.

In an alternate embodiment of the invention, the gels are used as a viscous sweep to clean out the annular space between the facing of the well bore and the drill pipe. The gels are sufficiently viscous to facilitate the removal of rock fragments and drill bit cuttings as the gel is passed down the drill pipe and back up the annular space. Although the polymer of the gel will swell to some extent through contact with casually encountered water, the controlled rate of swelling obtained through use of a composition of the invention enables the sweep to be pumped down well into the drill pipe or even the annular space before reaching maximum viscosity and thus requiring maximum pumping pressure.

The invention is further illustrated by the following Illustrative Embodiment which should not be construed as limiting the inventor.

Illustrative Embodiments

Experiments were performed to compare the rate of absorption of water by a water absorbent polymer in dry form as compared with an equivalent amount of the polymer provided in the form of a composition of the invention. In each case, the polymer used was a cross-linked polyacrylate polymer marked by Nalco Chemical Company as Nalco 1181 Superabsorbent Polymer. The polymer is a white to slightly yellow polymer having a bulk density of 30–40 lb/cu ft. and a particle size less than 45 microns. The polymer has a capacity to absorb distilled water of 150-250 g/g.

In a comparative example, not of the invention, the polymer was employed alone. In an embodiment illustrative of the invention, a liquid gel composition was prepared by mixing 19.8 lbs of a light, odorless paraffinic solvent, 0.5 lbs of the commercial mixture of alkyl phosphate esters having an average of eight carbon atoms per phosphorus manufactured and marketed by Nalco Chemical Company as ASP 166 Phosphate Ester, 0.1 lb of a basic sodium aluminate manufactured and marketed by Nalco Chemical Company as ASP 200 Sodium Aluminate and 8.0 lbs. of the water absorbent polymer. Test mixtures were prepared by adding 2.8 of the dry polymer in one case (Case A) and 10 ml of the composition, an equivalent amount, in a second case (Case B), to 350 ml of City of Houston tap water. Each mixture was stirred with a magnetic stirrer and the viscosity was determined with a Fann 35 viscometer.

A Fann 35 viscometer employs a cylindrical bob suspended from a spring and hanging concentrically in an outer cylinder. A calibrated disk is attached to the top of the bob to turn with the bob. The assembly is lowered to a prescribed mark in the mixture being tested and the outer cylinder is rotated at a constant speed, typically at 300 rpm and/or 600 rpm. The viscous drag of the mixture being tested turns the bob until balanced by the torque in the spring. The deflection of the bob is read from the calibrated dial on the top of the instrument and provides a measure of the viscosity of the mixture being tested in centipoises. This type of instrument is conventional for measuring the viscosity of thickened fluids.

In the data that follow in Table, the rate of increase in viscosity is a measure of the rate of water absorption of the polymer.

TABLE

| MINUTES | CASE A | | CASE B | |
|---|---|---|---|---|
| | 600 rpm | 300 rpm | 600 rpm | 300 rpm |
| 3 | >300 cps | >300 cps | 35 cps | 20 cps |
| 5 | >300 cps | >300 cps | 65 cps | 38 cps |
| 8 | >300 cps | >300 cps | 105 cps | 50 cps |
| 10 | >300 cps | >300 cps | 135 cps | 80 cps |

In sufficient time, the viscosity of the mixture of Case B would also exceed 300 centipoises, the limit of the apparatus.

What is claimed is:

1. In the process of reducing loss of circulation fluid during the drilling of a borehole penetrating a subterranean formation by injecting into the borehole a slug of hydrocarbon containing a polymer capable of substantially expanding on contact with water, subsequently injecting into the borehole a discrete slug of water and forcing the water slug and the polymer slug into a lost circulation zone within the formation whereby the water absorbent polymer absorbs water to expand and close off the lost circulation zone, the improvement which comprises providing the hydrocarbon polymer mixture as a thixotropic hydrocarbon gel of a cross-linked polymer, the mixture being gelled by the presence of phosphorus-containing hydrocarbon gelling agents.

2. In the process of reducing loss of circulation fluid during the drilling of a borehole penetrating a subterranean formation by injecting into the borehole a slug of hydrocarbon containing a polymer capable of substantially expanding on contact with water, subsequently injecting into the borehole a discrete slug of water and forcing the water slug and the polymer slug into a lost circulation zone within the formation whereby the water absorbent polymer absorbs water to expand and close off the lost circulation zone, the improvement which comprises providing the hydrocarbon polymer mixture as a thixotropic hydrocarbon gel comprising the hydrocarbon, a water absorbent polymer capable of absorbing at least 100 times the weight of the polymer in water, a phosphorus-containing gelling agent and an anionic or nonionic surface active agent.

3. The process of claim 2 wherein the crosslinked polymer contains at least 50% by mole of at least one polymerized monomer selected from unsaturated carboxylic acid, unsaturated carboxylic acid anhydride, unsaturated sulfonic acid or mixtures thereof.

4. The process of claim 3 wherein the surface active agent is anionic.

5. The process of claim 3 wherein the surface active agent is nonionic.

6. The process of claim 5 wherein the polymer is a crosslinked polymer and contains at least 75% by mole of a homopolymer of methacrylic acid or acrylic acid.

7. The process of claim 6 wherein the gelling agent is the produce of an alkyl phosphate ester having an average of from about 4.8 to about 8 carbon atoms per phosphorus atom and a basic aluminum compound.

8. The process of claim 7 wherein the surface active agent is a ethoxylated alkylphenol.

9. The process of claim 8 wherein the polymer is a crosslinked homopolymer of acrylic acid.

* * * * *